US012786322B2

(12) United States Patent
Itoh

(10) Patent No.: US 12,786,322 B2
(45) Date of Patent: Nov. 3, 2026

(54) IMAGE FORMING APPARATUS, CONTROL METHOD FOR IMAGE FORMING APPARATUS, AND STORAGE MEDIUM THAT ARE CAPABLE OF ACQUIRING ADJUSTMENT IMAGE THAT CAN BE SUFFICIENTLY USED FOR POSITION ADJUSTMENT OF IMAGE REGARDLESS OF SIZE OF SHEET WHEN POSITION ADJUSTMENT OF IMAGE WITH RESPECT TO SHEET IS PERFORMED

(71) Applicant: CANON KABUSHIKI KAISHA, Tokyo (JP)

(72) Inventor: Jun Itoh, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 415 days.

(21) Appl. No.: 18/590,226

(22) Filed: Feb. 28, 2024

(65) Prior Publication Data

US 2024/0305735 A1 Sep. 12, 2024

(30) Foreign Application Priority Data

Mar. 7, 2023 (JP) ................................ 2023-034559

(51) Int. Cl.
*H04N 1/00* (2006.01)
*H04N 1/387* (2006.01)

(52) U.S. Cl.
CPC ..... *H04N 1/00087* (2013.01); *H04N 1/00015* (2013.01); *H04N 1/00031* (2013.01); *H04N 1/00045* (2013.01); *H04N 1/00063* (2013.01); *H04N 1/00748* (2013.01); *H04N 1/3872* (2013.01)

(58) Field of Classification Search
CPC ........... H04N 1/00087; H04N 1/00015; H04N 1/00031; H04N 1/00045; H04N 1/00063; H04N 1/00748; H04N 1/3872
See application file for complete search history.

(56) References Cited

U.S. PATENT DOCUMENTS

2016/0162762 A1 6/2016 Maeda
2021/0382421 A1* 12/2021 Yumoto ............. G03G 15/2039

FOREIGN PATENT DOCUMENTS

JP 2016111628 A 6/2016

* cited by examiner

*Primary Examiner* — Nicholas Pachol
(74) *Attorney, Agent, or Firm* — ROSSI, KIMMS & McDOWELL LLP

(57) ABSTRACT

An image forming apparatus capable of performing image formation and position adjustment prior to the image formation includes a printing unit capable of printing an adjustment chart used for the position adjustment, a storage unit to store lengths of the adjustment chart in a main scanning direction and in a sub-scanning direction, a reading unit to read the adjustment chart printed by the printing unit and acquire a read image of the adjustment chart, and a cutting unit to cut out an adjustment image from the read image. The reading unit reads the adjustment chart in a maximum range readable by the reading unit to acquire the read image. The cutting unit determines a cutout range of the adjustment image with respect to the read image based on the lengths of the adjustment chart and cuts out the adjustment image in the cutout range.

10 Claims, 17 Drawing Sheets

FIG. 6C

6000

| FRONT SIDE/BACK SIDE | FRONT SIDE |
|---|---|
| (A) MAIN SCANNING SHEET SIZE | 2973 |
| (B) SUB-SCANNING SHEET SIZE | 4201 |
| (C) UPPER LEFT MARKER END (MAIN SCANNING) | 99 |
| (D) UPPER LEFT MARKER END (SUB-SCANNING) | 99 |
| (E) LOWER LEFT MARKER END (MAIN SCANNING) | 100 |
| (F) LOWER LEFT MARKER END (SUB-SCANNING) | 101 |
| (G) UPPER RIGHT MARKER END (MAIN SCANNING) | 100 |
| (H) UPPER RIGHT MARKER END (SUB-SCANNING) | 101 |
| (I) LOWER RIGHT MARKER END (MAIN SCANNING) | 101 |
| (J) LOWER RIGHT MARKER END (SUB-SCANNING) | 100 |
| | |

UNIT: 0.1mm

IMAGE FORMING APPARATUS, CONTROL METHOD FOR IMAGE FORMING APPARATUS, AND STORAGE MEDIUM THAT ARE CAPABLE OF ACQUIRING ADJUSTMENT IMAGE THAT CAN BE SUFFICIENTLY USED FOR POSITION ADJUSTMENT OF IMAGE REGARDLESS OF SIZE OF SHEET WHEN POSITION ADJUSTMENT OF IMAGE WITH RESPECT TO SHEET IS PERFORMED

BACKGROUND OF THE INVENTION

Field of the Invention

The present invention relates to an image forming apparatus, a control method for the image forming apparatus, and a storage medium.

Description of the Related Art

Conventionally, as a printing apparatus (an image forming apparatus) that forms an image on a sheet that is a recording medium, that is, a printing sheet, an apparatus capable of adjusting an image forming position with respect to the sheet has been known (see Japanese Laid-Open Patent Publication (kokai) No. 2016-111628). The apparatus disclosed in Japanese Laid-Open Patent Publication (kokai) No. 2016-111628 includes a scanner unit (an automatic document feeder (ADF)) that reads a sheet on which marks for image position adjustment are printed while conveying the sheet. In addition, in the apparatus disclosed in Japanese Laid-Open Patent Publication (kokai) No. 2016-111628, by acquiring a positional relationship between the marks and sheet edges of the sheet based on a reading result obtained by the scanner unit, it is possible to acquire parameters (correction values) for the image position adjustment. It should be noted that the parameters for the image position adjustment differ depending on the size (shape) of the sheet, so they are acquired for each type of sheet. In addition, in the image position adjustment, in order to acquire the positional relationship between the marks and the sheet edges, the sheet edges of the sheet must be included in the image read by the scanner unit. For example, in the case that the sheet has an irregular size, in a state before the start of reading of the sheet, the length of the sheet in a sub-scanning direction, that is, the length of the sheet in a conveyance direction in the scanner unit is unknown. Therefore, in the scanner unit, after reading the sheet with the maximum readable sub-scanning length, a cutting processing that cuts out an image for the image position adjustment with the length of the sheet in the sub-scanning direction, which is detected by a sensor or the like, is performed.

However, in some printing apparatuses, when performing the cutting processing, the length of the sheet in the sub-scanning direction is detected, for example, to be shorter than the original length of the sheet. In this case, the image for the image position adjustment becomes a state in which the sheet edges of the sheet are not included therein, and as a result, it may be difficult to perform the image position adjustment.

SUMMARY OF THE INVENTION

The present invention provides a mechanism capable of acquiring an adjustment image that can be sufficiently used for position adjustment of an image regardless of a size of a sheet when the position adjustment of the image with respect to the sheet is performed.

Accordingly, the present invention provides an image forming apparatus capable of performing image formation on a sheet and performing position adjustment of an image with respect to the sheet prior to the image formation, the image forming apparatus comprising a printing unit configured to be capable of printing an adjustment chart used for the position adjustment, a storage unit configured to store a length of the adjustment chart in a main scanning direction and a length of the adjustment chart in a sub-scanning direction, a reading unit configured to read the adjustment chart printed by the printing unit and acquire a read image of the adjustment chart, and a cutting unit configured to cut out an adjustment image to be used for the position adjustment from the read image. The reading unit reads the adjustment chart in a maximum range readable by the reading unit to acquire the read image. The cutting unit determines a cutout range of the adjustment image with respect to the read image based on the length of the adjustment chart in the main scanning direction and the length of the adjustment chart in the sub-scanning direction, which have been stored in the storage unit, and cuts out the adjustment image in the cutout range.

According to the present invention, it is possible to acquire the adjustment image that can be sufficiently used for the position adjustment of the image regardless of the size of the sheet, when the position adjustment of the image with respect to the sheet is performed.

Further features of the present invention will become apparent from the following description of exemplary embodiments with reference to the attached drawings.

BRIEF DESCRIPTION OF THE DRAWINGS

FIG. 6C is a diagram showing a table of an example of the dimensions shown in FIG. 6B.

DESCRIPTION OF THE EMBODIMENTS

The present invention will now be described in detail below with reference to the accompanying drawings showing embodiments thereof.

Hereinafter, an embodiment of the present invention will be described in detail with reference to the drawings. However, the configuration described in the following embodiment is merely an example, and the scope of the present invention is not limited by the configuration described in the following embodiment. For example, each unit (each part) constituting the present invention can be replaced with a unit having any configuration capable of performing similar functions. In addition, any component may be added.

Figure 1A:
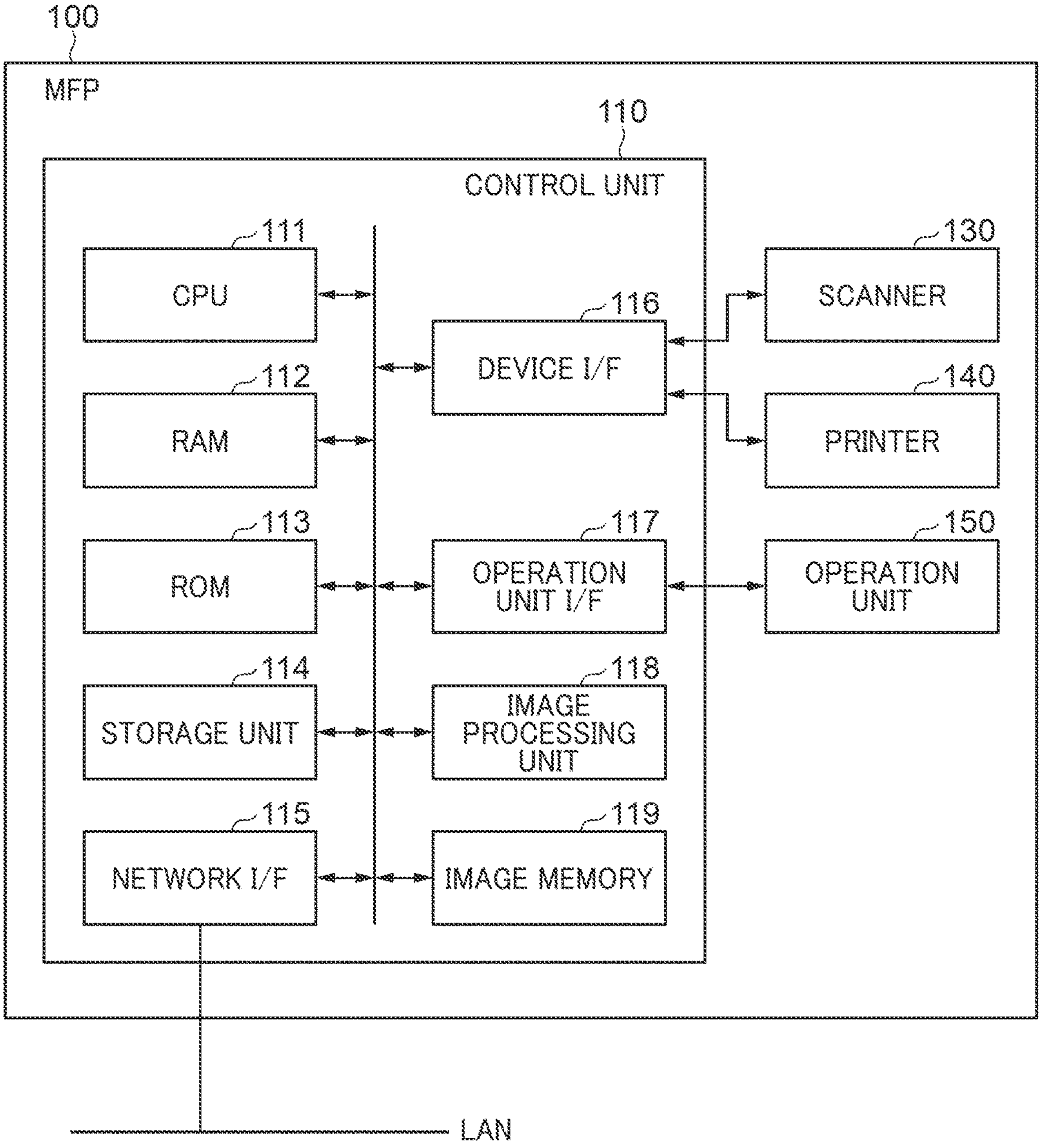
FIG. 1A is a block diagram showing a hardware configuration of an image forming apparatus.

FIG. 1A is a block diagram showing a hardware configuration of an image forming apparatus. As shown in FIG. 1A, the image forming apparatus is applied to a multi-function peripheral (MFP) 100. The MFP 100 includes a control unit 110, a scanner (a reading unit) 130, a printer (a printing unit) 140, and an operation unit 150, which are communicably connected to each other. The control unit 110 is able to control the scanner 130 that is an image input device, the printer 140 that is an image output device, and the operation unit 150 that is an operation device. In addition, the control unit 110 is connected to a local area network (LAN) (not shown), and performs the reception of printing jobs, etc. via the LAN.

The control unit 110 includes a central processing unit (CPU) 111, a R random access memory (RAM) 112, a read only memory (ROM) 113, a storage unit 114, a network interface (a network I/F) 115, a device I/F 116, an operation unit I/F 117, an image processing unit 118, and an image memory 119. The CPU 111 controls operations of the MFP 100, and operates based on a program stored in the RAM 112. The ROM 113 is a boot ROM, and stores a boot program for system booting (starting the system). The storage unit 114 stores system software, image data, programs for controlling the operations of the MFP 100, etc. It should be noted that the programs include, for example, programs or the like for causing a computer to execute each unit of the MFP 100 and each step of the MFP 100 (a control method for the image forming apparatus). In addition, the programs are loaded into the RAM 112. Moreover, the CPU 111 controls various kinds of operations of the MFP 100 based on the programs. The network I/F 115 is connected to the LAN. As a result, it is possible to input and output various kinds of information to and from the outside. The device I/F 116 connects the scanner 130 and the printer 140 to the control unit 110, and performs synchronous/asynchronous conversion of image data. The operation unit I/F 117 is an interface that connects the operation unit 150 and the control unit 110, and outputs image data to the operation unit 150. As a result, an image is displayed on the operation unit 150. In addition, the operation unit I/F 117 transmits information inputted from the operation unit 150 by a user to the CPU 111. The image processing unit 118 performs image processing with respect to print data inputted via the LAN or performs image processing with respect to image data inputted/outputted via the device I/F 116. The image memory 119 is a memory for temporarily loading the image data processed by the image processing unit 118.

Figure 1B:
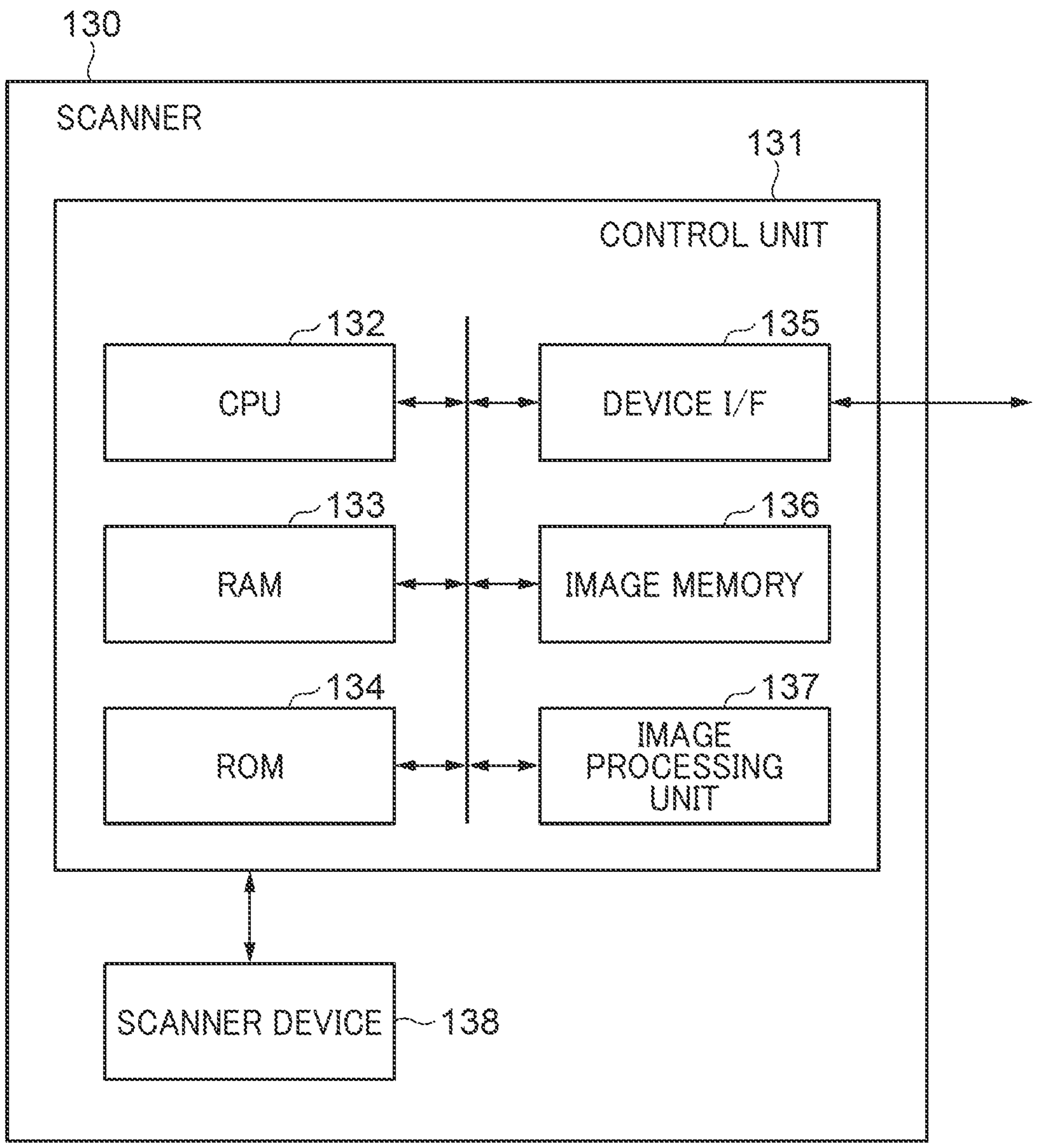
FIG. 1B is a block diagram showing a hardware configuration of a scanner included in the image forming apparatus shown in FIG. 1A.

FIG. 1B is a block diagram showing a hardware configuration of a scanner included in the image forming apparatus shown in FIG. 1A. As shown in FIG. 1B, the scanner 130 includes a control unit 131 and a scanner device 138, which are communicably connected to each other. The control unit 131 includes a CPU 132, a RAM 133, a ROM 134, a device I/F 135, an image memory 136, and an image processing unit 137. The CPU 132 controls operations of the scanner 130, and operates based on a program stored in the ROM 134 and loaded into the RAM 133. The device I/F 135 is connected to the control unit 110 and performs synchronous/asynchronous conversion of image data. The image memory 136 is a memory for temporarily loading image data inputted from the scanner device 138. The control unit 131 transmits image data stored in the image memory 136 to the control unit 110 based on an image transfer command received via the device I/F 135. The image processing unit 137 performs image processing with respect to the image data loaded into the image memory 136. Printing paper (printing sheets) used for printing with the MFP 100 is managed by a database that is a cassette library. The cassette library is stored in the storage unit 114 or the RAM 112, and each software module reads from and writes to the cassette library as necessary. Since the cassette library is publicly known, details thereof will be omitted.

Figure 2:
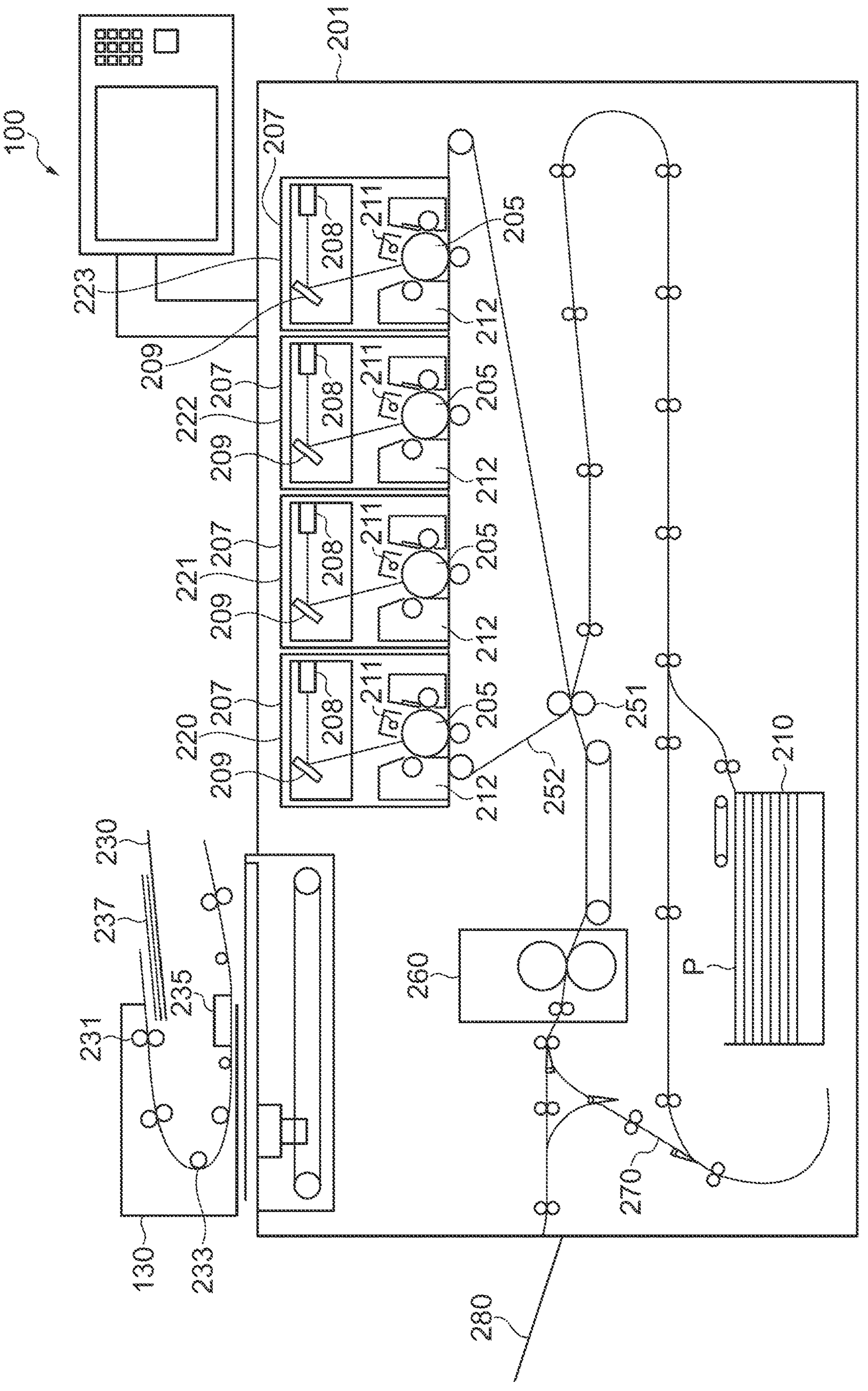
FIG. 2 is a schematic diagram showing an internal mechanical configuration of the image forming apparatus shown in FIG. 1A.

FIG. 2 is a schematic diagram showing an internal mechanical configuration of the image forming apparatus shown in FIG. 1A. As shown in FIG. 2, the MFP 100 includes a housing 201, an engine unit, an engine control unit that performs control related to each printing process (for example, a sheet feeding process or the like), and a control board housing unit that houses a printer controller.

The engine unit is provided with an optical processing mechanism that forms an electrostatic latent image on a photosensitive drum 205 by scanning with laser light, develops the electrostatic latent image, multiple-transfers the developed image to an intermediate transfer body 252, and transfers a color image to a sheet P. In addition, the engine unit is provided with a fixing processing mechanism for fixing a toner image transferred to the sheet P, a sheet feeding processing mechanism for the sheet P, and a conveyance processing mechanism for the sheet P. The optical processing mechanism includes a laser driver, which drives laser light emitted from a semiconductor laser (not shown) to turn on and off according to image data supplied from the printer controller, in a laser scanner unit 207. The laser light emitted from the semiconductor laser is deflected in a scanning direction by a rotating polygon mirror 208. The laser light deflected in a main scanning direction is guided to the photosensitive drum 205 via a reflecting polygon mirror 209, and exposes the photosensitive drum 205 in the main scanning direction. In addition, the electrostatic latent image that is charged by a primary charger 211 and is formed on the photosensitive drum 205 by scanning exposure with the laser light is developed as the toner image with the toner supplied by a developer 212. Moreover, the developed toner image on the photosensitive drum 205 is transferred (primarily transferred) onto the intermediate transfer body 252, to which a voltage having characteristic opposite to those of the toner image is applied. When forming the color image, respective colors from a yellow (Y) station 220, a magenta (M) station 221, a cyan (C) station 222, and a black (K) station 223 are sequentially formed on the intermediate transfer body 252. As a result, a full-color visible image is formed on the intermediate transfer body 252.

Furthermore, the sheet P fed from a transfer sheet stocker (a transfer material stocker) 210 is conveyed. A transfer roller 251 presses the sheet P against the intermediate transfer body 252, and applies a bias having characteristics opposite to those of the toner on the transfer roller 251. As a result, the visible image is formed on the intermediate transfer body 252. The visible image is transferred (secondarily transferred) to the sheet P conveyed by the sheet feeding processing mechanism. The secondarily transferred sheet P passes through a fixer 260. As a result, the toner transferred onto the sheet P is heated and melted, and is fixed to the sheet P as an image. It should be noted that, in the case of double-sided printing, the sheet P passes through a reversing portion 270, is switched back and reversed, and is introduced into a transfer unit 240 again. As a result, a back image is transferred to the sheet P. Thereafter, the sheet P passes through the fixer 260 in the similar manner as described above, whereby the toner image on the sheet P is heated and fixed. The sheet P is discharged to a sheet discharging unit 280, whereby the printing process is completed.

In addition, the MFP 100 includes the scanner 130. The scanner 130 includes respective mechanisms constituting the scanner 130, a scanner control unit that performs control related to a document reading process (for example, a document conveyance process and the like) performed by the respective mechanisms, and a control board housing unit that houses a scanner controller. The mechanism constituting the scanner includes a conveyance roller 231 for conveying a document 237 placed on a document conveyance device (an ADF) 230. In addition, the mechanism constituting the scanner includes a detection sensor 233 that detects passage of the document 237 being conveyed, a reading sensor 235 that performs reading of the document 237, etc. The detection sensor 233 detects that the front end (the tip end) and the rear end (the base end) of the document 237 have passed. Moreover, it is possible to detect the length of the document 237 in a sub-scanning direction (a conveyance direction of the document) based on a time difference between passing timings.

Figure 3:
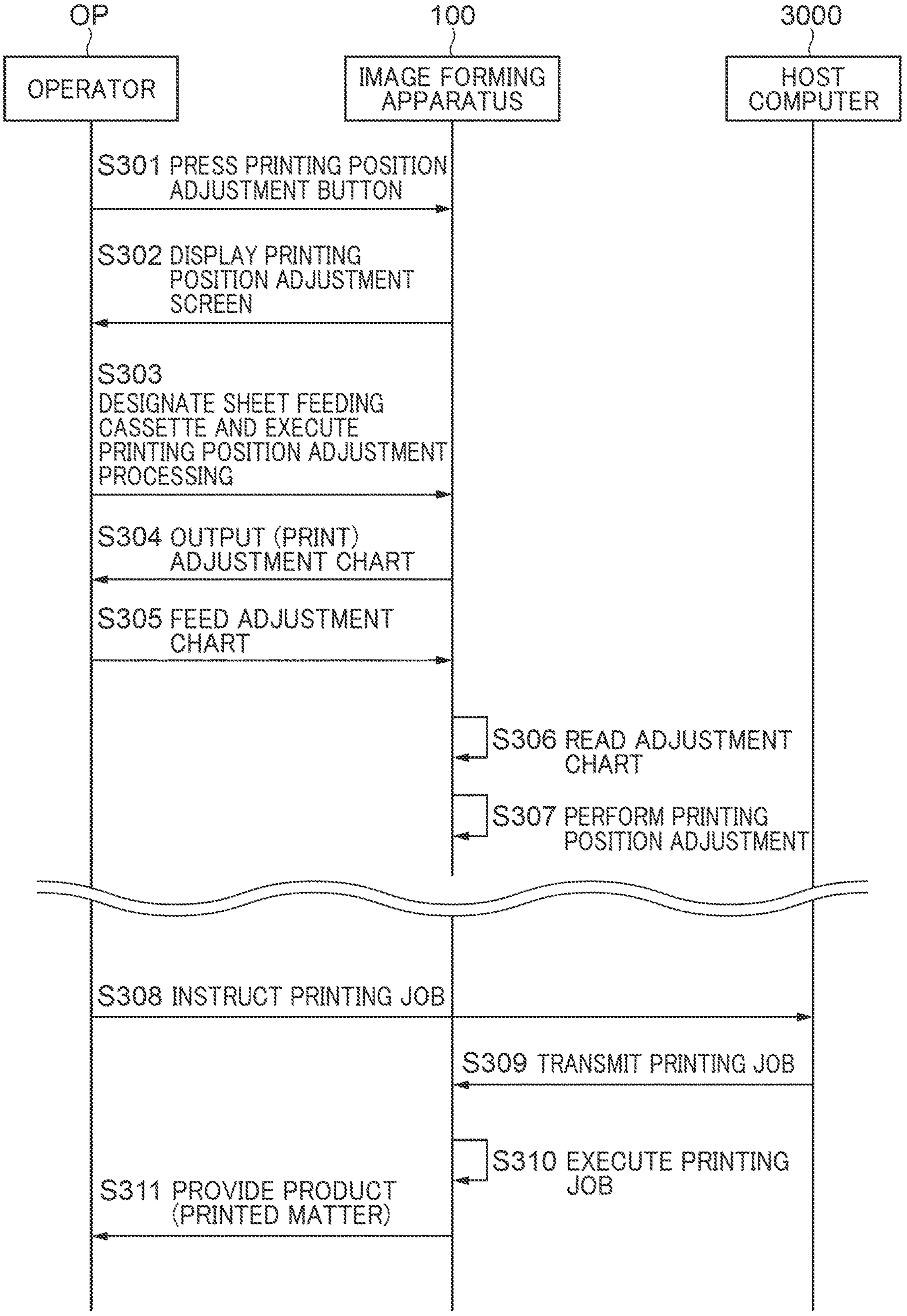
FIG. 3 is a sequence diagram showing processing (image position adjustment and image formation) executed by a multi-function peripheral (MFP).

The MFP 100 is configured to be able to perform image formation on the sheet P and perform position adjustment of the image with respect to the sheet P (hereinafter, referred to as "printing position adjustment (image position adjustment) ") prior to the image formation. FIG. 3 is a sequence diagram showing processing (the image position adjustment and the image formation) executed by the MFP 100. The sequence diagram shown in FIG. 3 shows processing executed between an operator OP, the MFP 100, and a host computer 3000. It should be noted that this processing is started in a state where a cassette library edit screen (not shown) is displayed on the operation unit 150 of the MFP 100. As shown in FIG. 3, in a step S301, the operator OP operates "a printing position adjustment button" within the cassette library edit screen. As a result, the MFP 100 determines to start the printing position adjustment.

In a step S302, the MFP 100 displays a printing position adjustment screen on the operation unit 150 under the control of the CPU 111.

In a step S303, the operator OP designates "scanner" and "use document conveyance device" within the printing position adjustment screen, and designates a sheet feeding cassette of the MFP 100. As a result, the CPU 111 executes a printing position adjustment processing.

In a step S304, the MFP 100 prints an adjustment chart used for the printing position adjustment under the control of the CPU 111 (a printing step). The process of the step S304 corresponds to the process of a step S501 (see FIG. 5). Hereinafter, a conveyance direction of the adjustment chart (the sheet) in the MFP 100 may be referred to as "a sub-scanning direction (an X-direction)", and a direction perpendicular to the conveyance direction and a thickness direction of the adjustment chart may be referred to as "a main scanning direction (a Y-direction)". The adjustment chart is placed on the sheet discharging unit 280 of the printer 140. It should be noted that the number of adjustment charts only needs to be one or more, and for example, only printing of a preset number of adjustment charts may be performed by default, or the operator OP may set the number of adjustment charts before operating the printing position adjustment button and then printing of only the set number of adjustment charts may be performed. The set number of adjustment charts is stored in the storage unit 114. Moreover, the MFP 100 displays an adjustment chart reading screen on the operation unit 150 under the control of the CPU 111.

In a step S305, the operator OP places the adjustment chart on the document conveyance device 230 and operates a reading start button 403 (see FIG. 4A) within the adjustment chart reading screen.

In a step S306, the MFP 100 reads (scans) the adjustment chart placed on the document conveyance device 230 with the scanner 130 under the control of the CPU 111. The process of the step S306 corresponds to the process of a step S502 (see FIG. 5).

In a step S307, the MFP 100 performs the printing position adjustment under the control of the CPU 111. The process of the step S307 corresponds to the processes of steps S503 to S507 (see FIG. 5). In addition, by performing this process, a printing position deviation amount (a parameter or an adjustment value) for each sheet feeding cassette is stored in the cassette library. In the MFP 100, the following image formation is performed based on the printing position deviation amount registered for each sheet feeding stage (each sheet feeding cassette).

In a step S308, the operator OP performs, for example, execution of a printing job 1 designating a sheet feeding cassette 1 with respect to the host computer 3000.

In a step S309, the host computer 3000 transmits the printing job 1 to the MFP 100.

In a step S310, the MFP 100 executes the printing job 1 under the control of the CPU 111. As a result, printing is performed with respect to the sheet in the sheet feeding cassette 1. When performing this printing, the printing position deviation amount registered in the sheet feeding cassette 1 is read out from the cassette library and is applied to the execution of the printing job 1.

In a step S311, the MFP 100 provides the operator OP with a product generated by executing the printing job 1, that is, a printed matter.

Figure 4A:
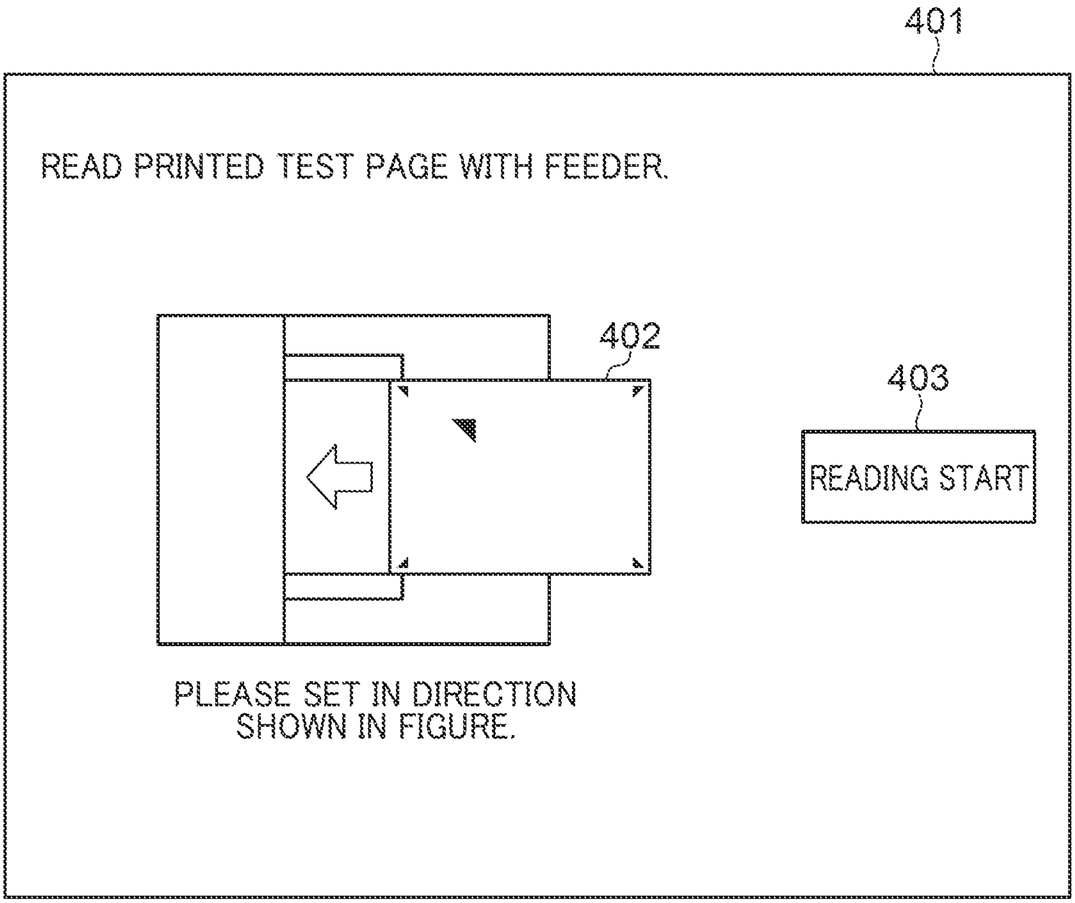
FIG. 4A is a diagram showing an example of a scan start screen displayed when a step S305 of a flowchart (the sequence) shown in FIG. 3 is executed.

FIG. 4A is a diagram showing an example of a scan start screen displayed when the step S305 of a flowchart (the sequence) shown in FIG. 3 is executed. A scan start screen 401 shown in FIG. 4A is displayed on the operation unit 150. The scan start screen 401 includes a thumbnail image 402 and the reading start button 403. As described above, in the step S305, the operator OP places the adjustment chart on the document conveyance device 230 and operates the reading start button 403 within the adjustment chart reading screen. The thumbnail image 402 displays a direction (posture) of the adjustment chart when the adjustment chart is placed on the document conveyance device 230. As a result, the operator OP is able to quickly and accurately place the adjustment chart on the document conveyance device 230. When the operator OP operates the reading start button 403, the process of the step S306 is executed, that is, reading of the adjustment chart with the scanner 130 is executed.

Figure 4B:
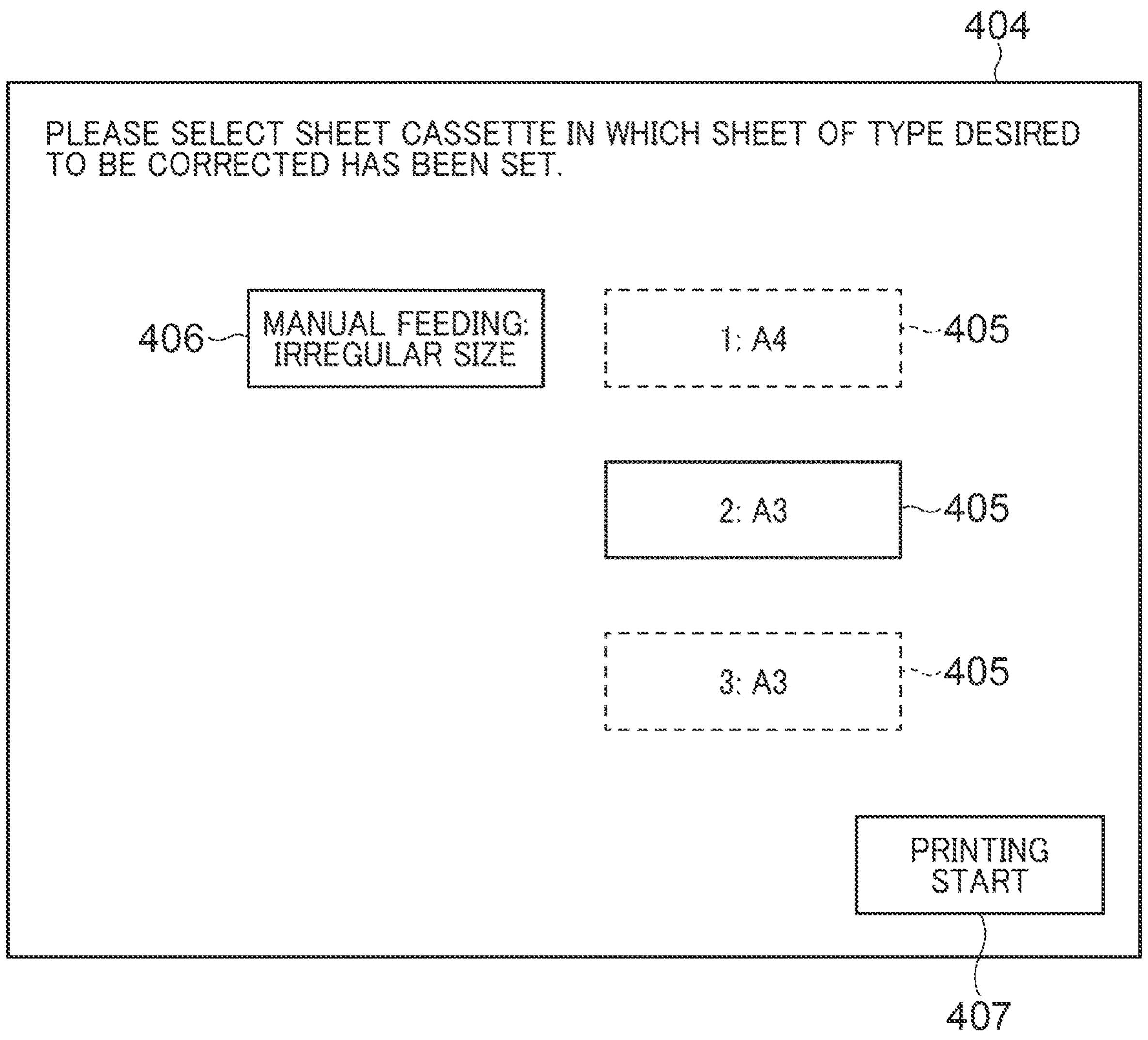
FIG. 4B is a diagram showing an example of a printing position adjustment screen displayed in a step S302 of the flowchart shown in FIG. 3.

FIG. 4B is a diagram showing an example of the printing position adjustment screen displayed in the step S302 of the flowchart shown in FIG. 3. A printing position adjustment screen 404 shown in FIG. 4B is displayed on the operation unit 150. The printing position adjustment screen 404 includes a sheet feeding stage 405, a sheet feeding stage 406, and a printing start button 407. The sheet feeding stage 405 indicates a sheet feeding stage having no sheet, that is, indicates a sheet feeding stage of the sheet for which the printing position adjustment (position correction) has been restricted. In addition, the sheet feeding stage 406 indicates a sheet feeding stage of the sheet to be subjected to the printing position adjustment (the position correction), that is, a sheet feeding stage of the sheet for which the printing position adjustment is possible. When the operator OP selects the sheet feeding stage 406 and operates the printing start button 407, the process of the step S304 is executed, that is, printing of the adjustment chart with the printer 140 is executed.

Figure 4C:
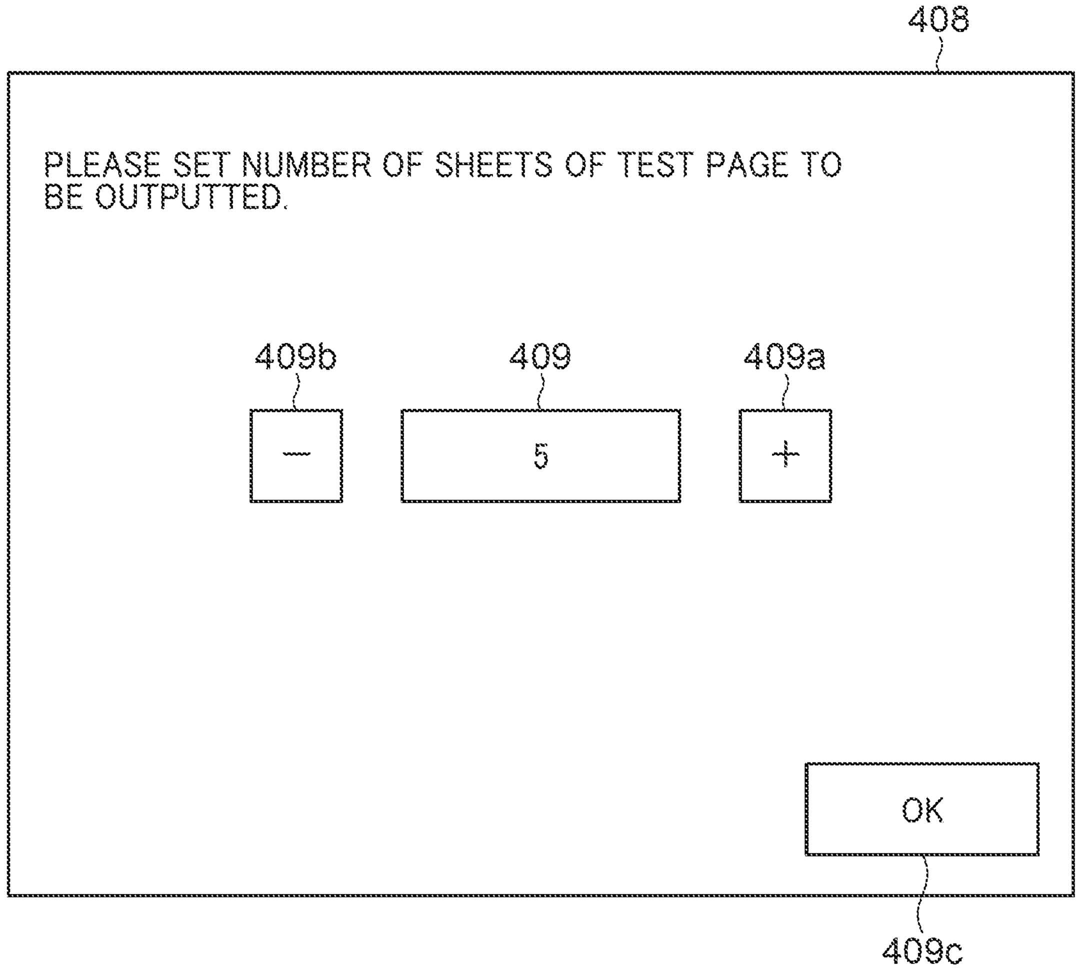
FIG. 4C is a diagram showing an example of a number-of-charts setting screen displayed in the step S302 of the flowchart shown in FIG. 3.

FIG. 4C is a diagram showing an example of a number-of-charts setting screen displayed in the step S302 of the flowchart shown in FIG. 3. A number-of-charts setting screen 408 shown in FIG. 4C is displayed on the operation unit 150 before the printing position adjustment screen 404 is displayed, or is displayed on the operation unit 150 together with the printing position adjustment screen 404. The number-of-charts setting screen 408 includes a number-of-charts setting section 409, a plus button 409*a*, a minus button 409*b*, and an OK button 409*c*. The operator OP is able to set the number of adjustment charts to be outputted (the number of output sheets of the adjustment chart) within the number-of-charts setting section 409 by operating the plus button 409*a* and the minus button 409*b*. By operating the OK button 409*c* after this setting, the number of adjustment charts to be outputted within the number-of-charts setting section 409 is determined and is stored in the RAM 112.

Figure 4D:
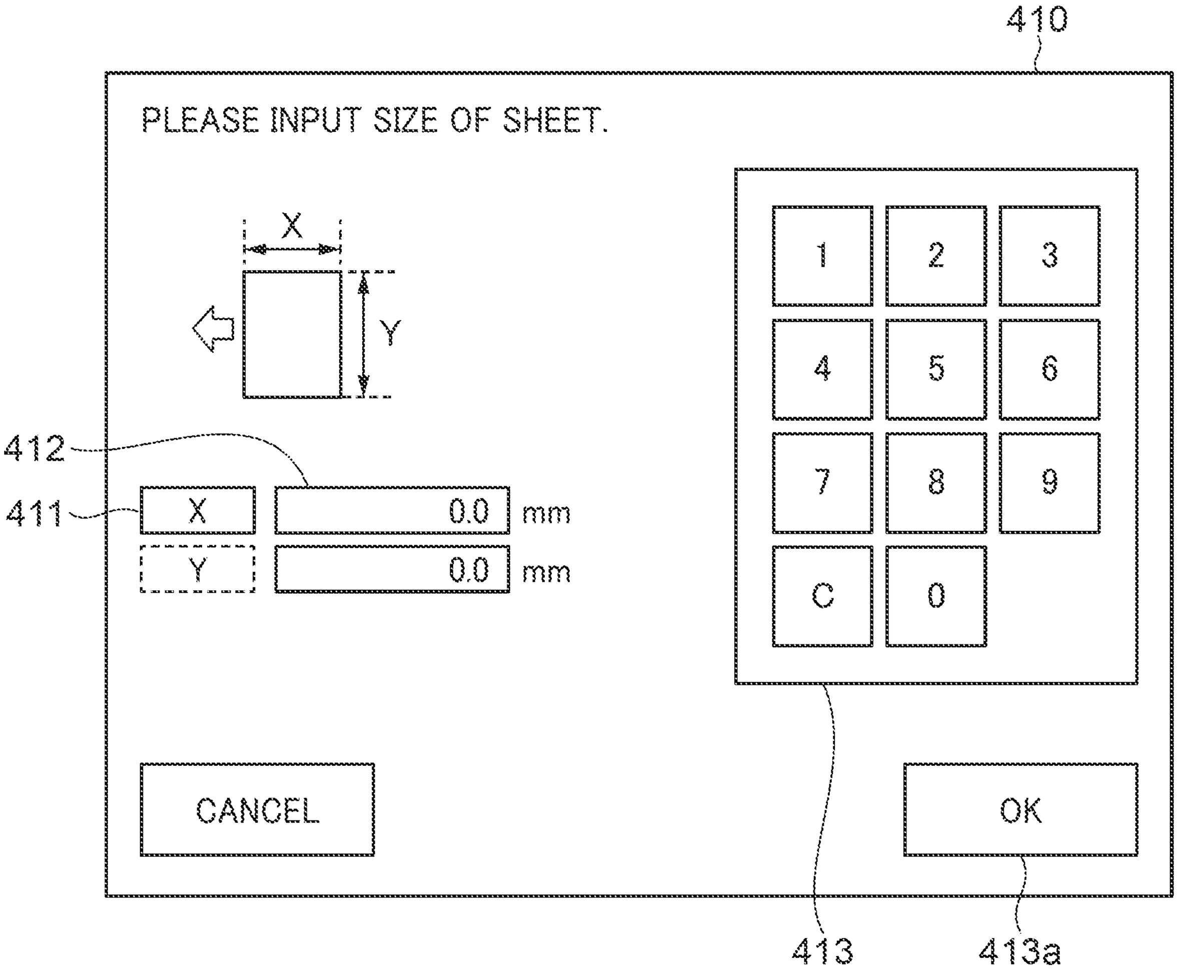
FIG. 4D is a diagram showing an example of a sheet size setting screen displayed in the step S302 of the flowchart shown in FIG. 3.

FIG. 4D is a diagram showing an example of a sheet size setting screen displayed in the step S302 of the flowchart shown in FIG. 3. A sheet size setting screen 410 shown in FIG. 4D is displayed on the operation unit 150 prior to printing of the adjustment chart. In addition, the sheet size setting screen 410 is displayed in the case that markers 601 (see FIGS. 6A and 6B) or the like used for the printing position adjustment are printed on a printing sheet (a sheet) having a size different from a regular size such as A3 or A4, that is, a printing sheet (a sheet) having an irregular size to obtain the adjustment chart. The sheet size setting screen 410 includes a selection button 411, an input box 412, a numeric keypad 413, and an OK button 413*a*. By using the selection button 411, it is possible to select inputting the length of the printing sheet (the sheet) in the main scanning direction (the Y-direction) or inputting the length of the printing sheet (the sheet) in the sub-scanning direction (the X-direction). By using the numeric keypad 413, it is possible to input the length selected by the selection button 411 into the input box 412. By operating the OK button 413*a* after this inputting, the length within the input box 412 is determined and is stored in the RAM 112. As described above, the sheet size setting screen 410 functions as an input section capable of appropriately inputting the length of the adjustment chart in the main scanning direction and the length of the adjustment chart in the sub-scanning direction. In addition, an input result obtained by the sheet size setting screen 410 (the input section), that is, the length of the adjustment chart in the main scanning direction and the length of the adjustment chart in the sub-scanning direction are stored in the RAM (a storage unit) 112 (a storing step).

In the MFP 100, the scanner 130 reads the adjustment chart printed by the printer 140 while conveying the adjustment chart, and acquires a read image of the adjustment chart (a reading step). Thereafter, the image processing unit (a cutting unit) 137 cuts out an adjustment image to be used for the printing position adjustment from the read image (a cutting step). As will be described below, in the cutting step, four margin lengths are set. The first margin length is a predetermined margin length ΔX1 from one edge (an edge on the front side in the conveyance direction) of the adjustment chart located in the sub-scanning direction. The second margin length is a predetermined margin length ΔX2 from the other edge (an edge on the rear side in the conveyance direction) of the adjustment chart located in the sub-scanning direction. The third margin length is a predetermined margin length ΔY1 from one edge (an edge on the left side when facing the conveyance direction) of the adjustment chart located in the main scanning direction. The fourth margin length is a predetermined margin length ΔY2 from the other edge (an edge on the right side when facing the conveyance direction) of the adjustment chart located in the main scanning direction.

Figure 4E:
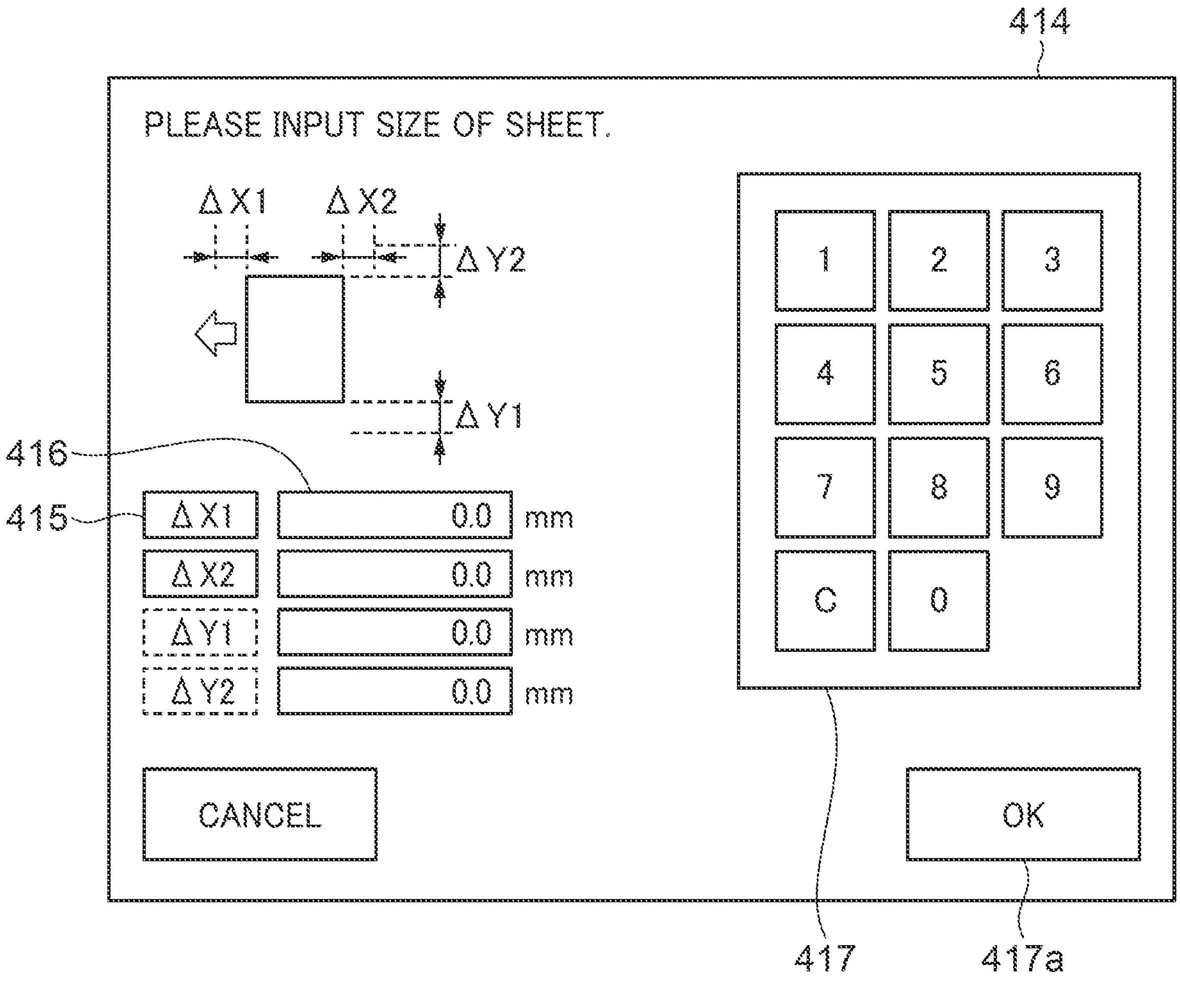
FIG. 4E is a diagram showing an example of a margin length setting screen displayed in the step S302 of the flowchart shown in FIG. 3.

FIG. 4E is a diagram showing an example of a margin length setting screen displayed in the step S302 of the flowchart shown in FIG. 3. A margin length setting screen 414 shown in FIG. 4E is displayed on the operation unit 150, for example, together with the sheet size setting screen 410. The margin length setting screen 414 includes a selection button 415, an input box 416, a numeric keypad 417, and an OK button 417*a*. By using the selection button 415, it is possible to select inputting the margin length ΔX1, inputting the margin length ΔX2, inputting the margin length ΔY1, or inputting the margin length ΔY2. By using the numeric keypad 417, it is possible to input the length selected by the selection button 415 into the input box 416. By operating the OK button 417*a* after this inputting, the length within the input box 416 is determined and is stored in the RAM 112. As described above, the margin length setting screen 414 functions as a setting section capable of appropriately setting the respective margin lengths. In addition, a setting result obtained by the margin length setting screen 414 (the setting section), that is, the respective margin lengths are stored in the RAM 112.

Figure 4F:
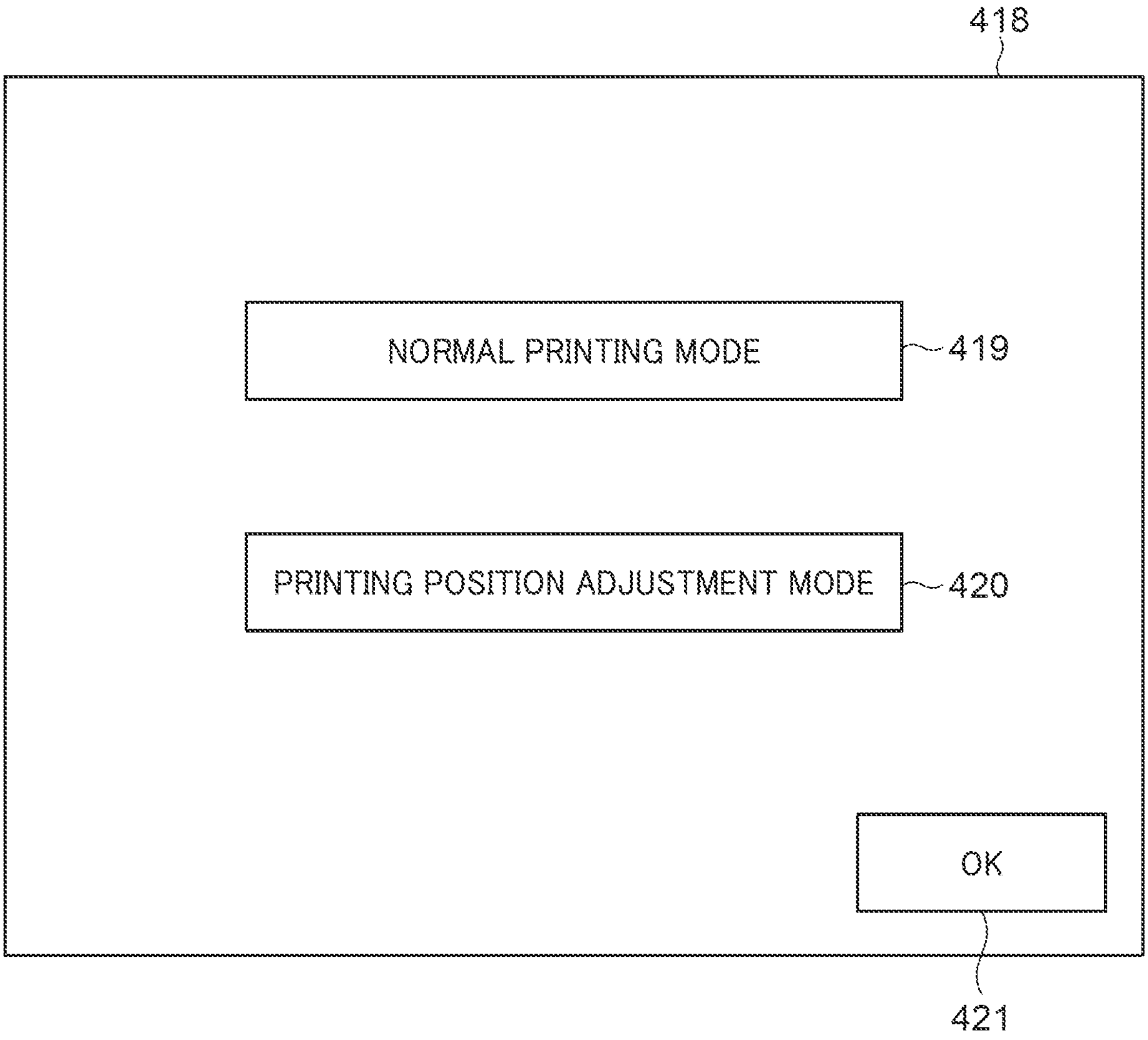
FIG. 4F is a diagram showing an example of a mode switching screen displayed before a step S301 and a step S308 of the flowchart shown in FIG. 3.

FIG. 4F is a diagram showing an example of a mode switching screen displayed before the step S301 and the step S308 of the flowchart shown in FIG. 3. A mode switching screen 418 shown in FIG. 4F is displayed on the operation unit 150. The mode switching screen 418 includes a normal printing mode 419, a printing position adjustment mode 420, and an OK button 421. The normal printing mode 419 is selected when the image formation on the sheet P is performed. The printing position adjustment mode 420 is selected when the printing position adjustment is performed prior to the image formation. Furthermore, by operating the OK button 421 after one of the normal printing mode 419 and the printing position adjustment mode 420 is selected, the execution of the selected one of the normal printing mode 419 and the printing position adjustment mode 420 (the selected one mode of the normal printing mode and the printing position adjustment mode) is determined. For example, by operating the OK button 421 after the printing position adjustment mode 420 is selected, the execution of the steps S301 to S307 becomes possible. In addition, by operating the OK button 421 after the normal printing mode 419 is selected, the execution of the steps S308 to S311 becomes possible. As described above, the mode switching screen 418 functions as a switching section that switches between the normal printing mode 419 (a mode for executing the image formation) and the printing position adjustment mode 420 (a mode for executing the position adjustment).

Figure 5:
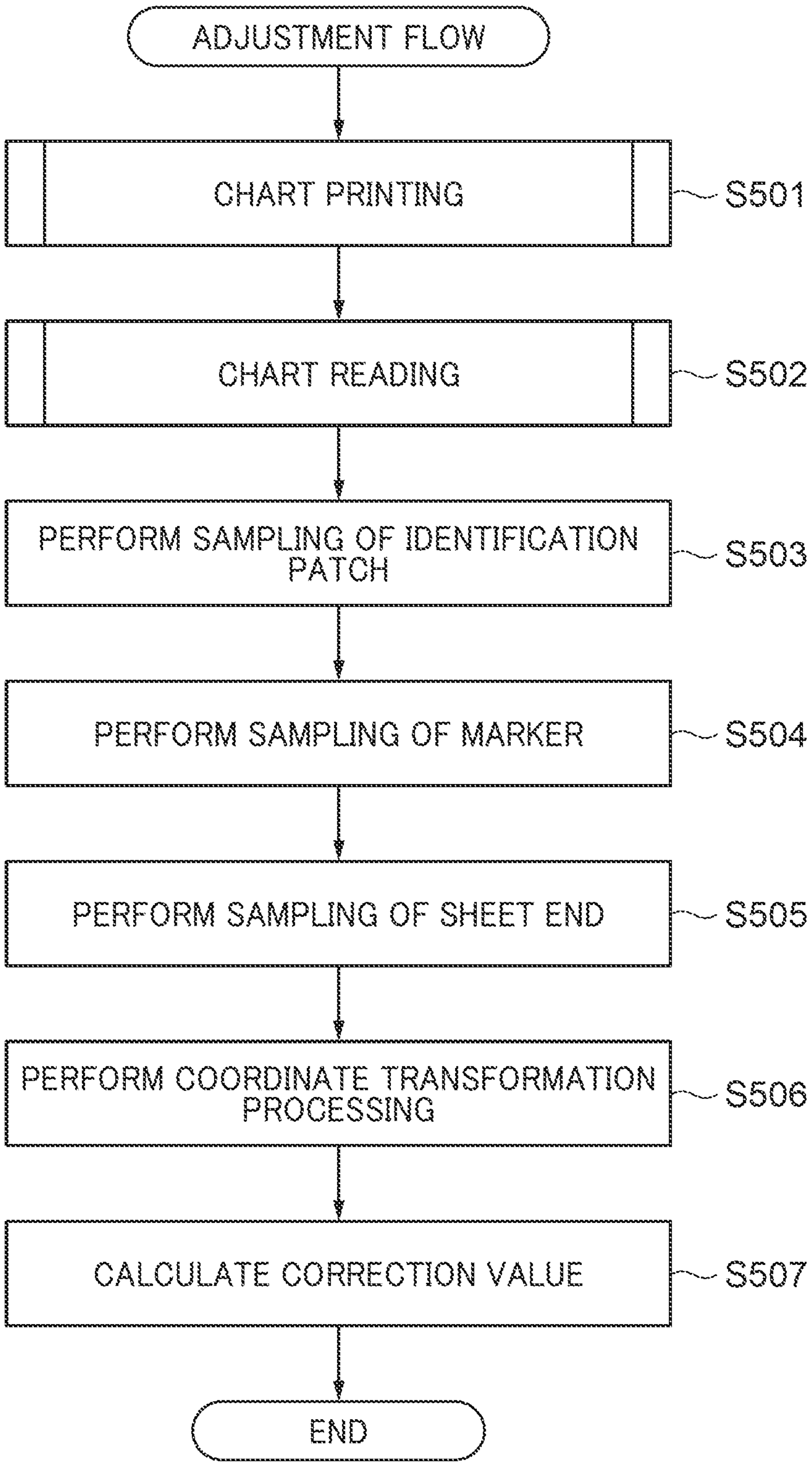
FIG. 5 is a flowchart showing a processing (a printing position adjustment processing) executed in a printing position adjustment mode.

FIG. 5 is a flowchart showing a processing (the printing position adjustment processing) executed in the printing position adjustment mode.

As shown in FIG. 5, in the step S501, the CPU 111 of the MFP 100 controls the printer 140 to print the adjustment chart based on setting conditions set (shown) in FIGS. 4B to 4E.

In the step S502, the CPU 111 controls the scanner 130 to read the adjustment chart printed in the step S501 and generate a read image of the adjustment chart.

In a step S503, the CPU 111 controls the image processing unit 137 to extract (sample) an identification patch 602 or an identification patch 604 in the read image from the read image generated in the step S502.

In a step S504, the CPU 111 controls the image processing unit 137 to extract (sample) the markers 601 in the read image from the read image generated in the step S502.

In a step S505, the CPU 111 controls the image processing unit 137 to extract (sample) edges (sheet ends) of the adjustment chart in the read image from the read image generated in the step S502.

In a step S506, the CPU 111 controls the image processing unit 137 to perform a processing of transforming coordinates of the identification patch 602 (or the identification patch 604), the markers 601, and the edges of the adjustment chart (that is, perform a coordinate transformation processing with respect to the identification patch 602 (or the identification patch 604), the markers 601, and the edges of the adjustment chart). It should be noted that the coordinate transformation processing in the step S506 is executed as necessary.

In a step S507, the CPU 111 calculates a correction value used for the printing position adjustment. Since the calculation of the correction value is publicly known, the description thereof will be omitted.

Figure 6A:
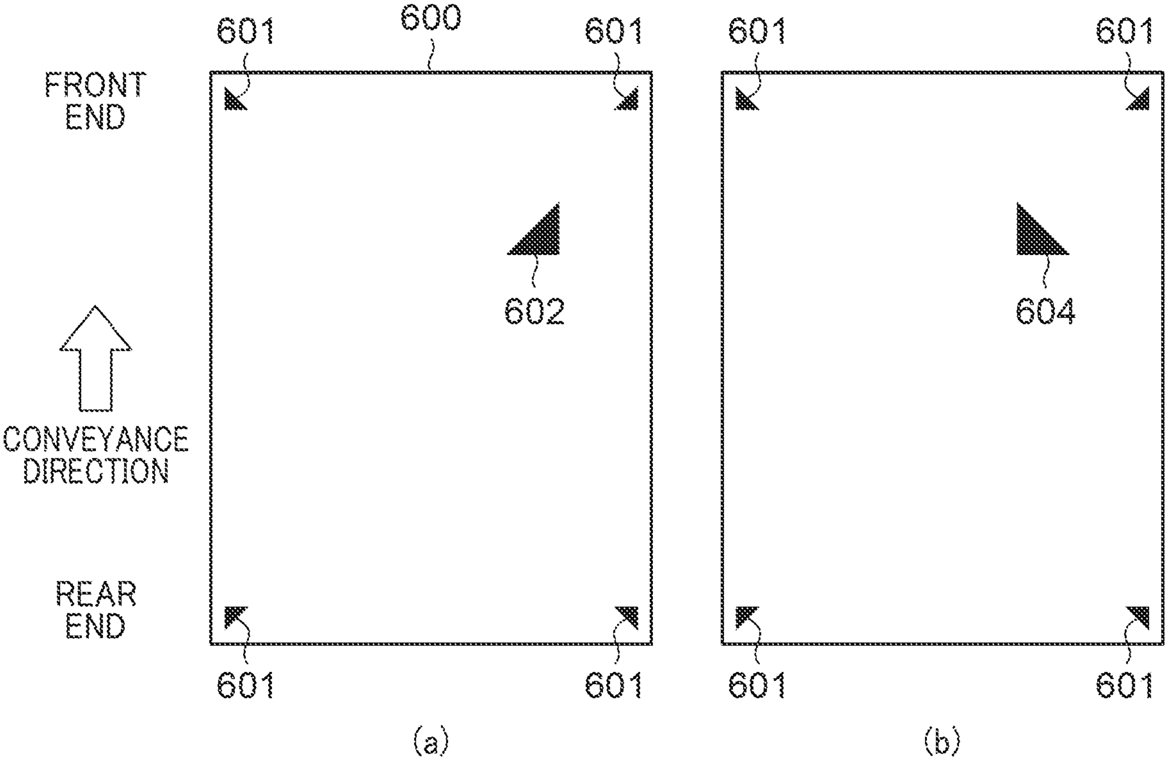
FIG. 6A is a diagram showing an example of an adjustment chart.

FIG. 6A is a diagram showing an example of the adjustment chart, (a) of FIG. 6A shows the front side of the adjustment chart, and (b) of FIG. 6A shows the rear side (the back side) of the adjustment chart. As shown in (a) of FIG. 6A, the markers 601 and the identification patch 602 are printed on the front side of an adjustment chart 600. Furthermore, as shown in (b) of FIG. 6A, the markers 601 and the identification patch 604 are printed on the rear side of the adjustment chart 600. In the present embodiment, the four markers 601 are arranged on the front side and the back side of the adjustment chart 600, respectively, but the present invention is not limited thereto. The four markers 601 are arranged near four corners of the adjustment chart 600 one by one. By controlling the image processing unit 137 to extract and analyze the markers 601, the CPU 111 is able to acquire information necessary for the printing position adjustment. It should be noted that in the present embodiment the shape of each of the markers 601 is a triangular shape, but is not limited thereto, and may be, for example, a point shape, a linear shape, a circular shape, a quadrangular shape, or the like.

The identification patch 602 and the identification patch 604 are used to determine a direction of the adjustment chart 600 placed on the document conveyance device 230. For example, in the case that the adjustment chart 600 is placed on the document conveyance device 230 by making the front end side of the adjustment chart 600 locate on the front side in the conveyance direction and then the adjustment chart 600 is conveyed from this state, the identification patch 602 or the identification patch 604 is detected. The identification patch 602 or the identification patch 604 is detected in an upper right region when facing the conveyance direction or a lower left region when facing the conveyance direction in four regions obtained by equally dividing the adjustment chart 600 into two pieces in each of the main scanning direction and the sub-scanning direction. In the case that the identification patch 602 is detected as the detection result, the CPU 111 determines that the adjustment chart 600 faces the front side. On the other hand, in the case that the identification patch 604 is detected as the detection result, the CPU 111 determines that the adjustment chart 600 faces the rear side. Furthermore, in the case that the position where the identification patch 602 or the identification patch 604 is detected at this time is in the upper right region, the CPU 111 determines that the placement direction is normal, and on the other hand, in the case that the position where the identification patch 602 or the identification patch 604 is detected at this time is in the lower left region, the CPU 111 determines that the placement direction is reversed.

Figure 6B:
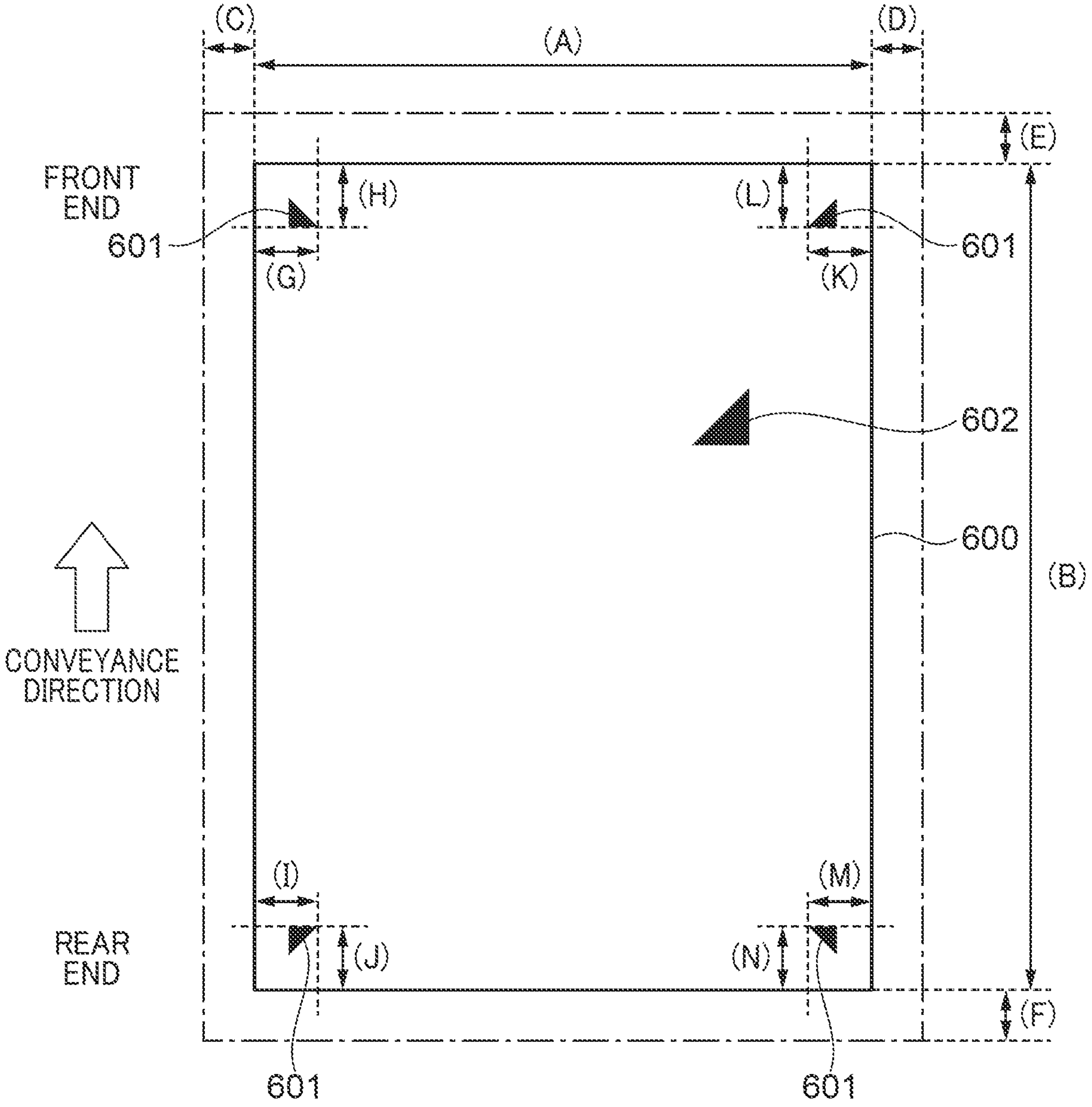
FIG. 6B is a diagram showing dimensions on a front side of the adjustment chart.

FIG. 6B is a diagram showing dimensions on the front side of the adjustment chart. It should be noted that dimensions on the rear side of the adjustment chart can be set to be similar to those in FIG. 6B. The CPU 111 detects a length A, a length B, and lengths G to N based on the processing result obtained in the image processing unit 137. The length A is a length of the adjustment chart 600 in the main scanning direction. The length B is a length of the adjustment chart 600 in the sub-scanning direction. Ideal values of the length A and the length B are sheet lengths defined in the paper library, respectively. The lengths G to N are each a distance from each of the markers 601 to the edge of the adjustment chart 600 closest to the each of the markers 601. The lengths C to F are lengths used to, when the scanner 130 acquires the read image of the adjustment chart 600, cause the read image include the edges of the adjustment chart 600. The length C is a length from one edge (the edge on the left side when facing the conveyance direction) of the adjustment chart located in the main scanning direction, and corresponds to the margin length $\Delta Y1$. The length D is a length from the other edge (the edge on the right side when facing the conveyance direction) of the adjustment chart located in the main scanning direction, and corresponds to the margin length $\Delta Y2$. The length E is a length from one edge (the edge on the front side in the conveyance direction) of the adjustment chart located in the sub-scanning direction, and corresponds to the margin length $\Delta X1$. The length F is a length from the other edge (the edge on the rear side in the conveyance direction) of the adjustment chart located in the sub-scanning direction, and corresponds to the margin length $\Delta X2$. The lengths G to N are each added for the purpose of acquiring the read image including the edges of the adjustment chart 600 even in the case that the adjustment chart 600 is conveyed in a skewed manner when the scanner 130 reads the adjustment chart 600. It should be noted that the lengths G to N may be set, for example, according to the conveyance performance of the scanner 130. In addition, the lengths C to F may all be the same length or may be all different lengths. Moreover, the lengths G to N may be values fixed in advance or may be changed depending on the size of the adjustment chart 600.

FIG. 6C is a diagram showing a table of an example of the dimensions shown in FIG. 6B. In a table 6000 shown in FIG. 6C, specific numerical values of the lengths A to N are described. In addition, the table 6000 is stored in the RAM 112 together with the determination results of the front side/rear side of the surface of the adjustment chart 600 and the placement direction.

Figure 7:
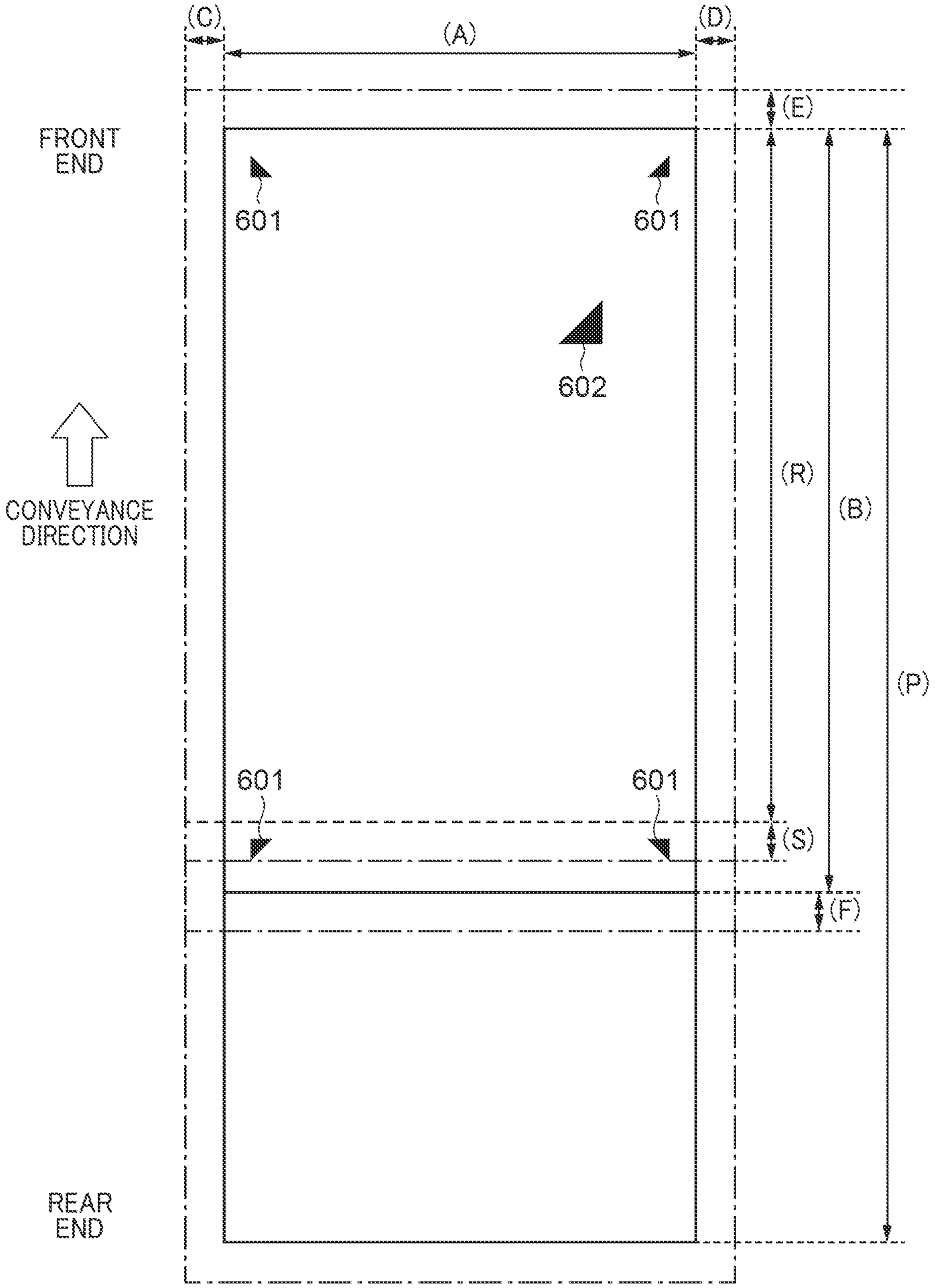
FIG. 7 is a diagram for describing a reading size when an adjustment chart having an irregular size is read.

FIG. 7 is a diagram for describing a reading size when the adjustment chart having an irregular size is read. In FIG. 7, the lengths A to F are the lengths described above. A length P is the maximum length in the sub-scanning direction, in which reading by the scanner 130 is possible. In the case of reading the adjustment chart having an irregular size, since the length B of the adjustment chart in the sub-scanning direction is unknown at a time point before the start of the reading, the scanner 130 performs reading in the length P and acquires a read image. It should be noted that the scanner 130 also has the maximum readable length in the main scanning direction, which can be described similarly to the length P, and thus the description about the main scanning direction will be omitted. The CPU 111 controls the image processing unit 137 to cut out an adjustment image to be used for the printing position adjustment from the read image. This adjustment image is an image obtained by cutting out the read image (which has been read by the maximum length P in the sub-scanning direction) by the length B from the front end in the sub-scanning direction. When acquiring the adjustment image, the MFP 100 determines a cutout range of the adjustment image with respect to the read image based on the length of the adjustment chart in the main scanning direction and the length of the adjustment chart in the sub-scanning direction, which are set on the sheet size setting screen 410. Furthermore, the image cut out in the cutout range becomes the adjustment image. As a result, it is possible to acquire an image including the edges located in the main scanning direction of the adjustment chart and the edges located in the sub-scanning direction of the adjustment chart, as the adjustment image, regardless of the size of the adjustment chart having an irregular size. The adjustment image is in a state of also including the markers 601 and the identification patch 602. It should be noted that the length B may be a length detected by the detection sensor 233. Furthermore, when acquiring an adjustment image in the case that the adjustment chart has a regular size, the application of the reading processing regarding the length P can be omitted.

In addition, a length of the cutout range of the adjustment image in the main scanning direction is preferably determined to be a length obtained by adding the length C (the margin length ΔY1) and the length D (the margin length ΔY2) to the length A of the adjustment chart in the main scanning direction. In addition, a length of the cutout range of the adjustment image in the sub-scanning direction is preferably determined to be a length obtained by adding the length E (the margin length ΔX1) and the length F (the margin length ΔX2) to the length B of the adjustment chart in the sub-scanning direction.

Here, in the case that the length B is detected by the detection sensor 233, since the length B is calculated based on a time difference when the front end and the rear end of the adjustment chart pass through the detection sensor 233, the detection accuracy of the length B may include, for example, an error of several millimeters. In this case, as shown in FIG. 7, there is a concern that a length R shorter than the original length B of the adjustment chart is detected and the read image is cut out in a length obtained by adding the length E and a length S (the length S is the same as the length E) to the length R. Depending on the length R, the adjustment image becomes an image that does not include the edges of the adjustment chart, which may make it difficult to perform the printing position adjustment. It should be noted that, although the case that the length R is shorter than the original length B has been described, the length R may be longer than the original length B. In this case, the adjustment image includes the edges of the adjustment chart. However, since the distance from the marker 601 to the edge on the rear end side in the sub-scanning direction is longer than the original length, it may become difficult to acquire accurate distances (the length J and the length N), and as a result, it may become difficult to perform the printing position adjustment.

Figure 8:
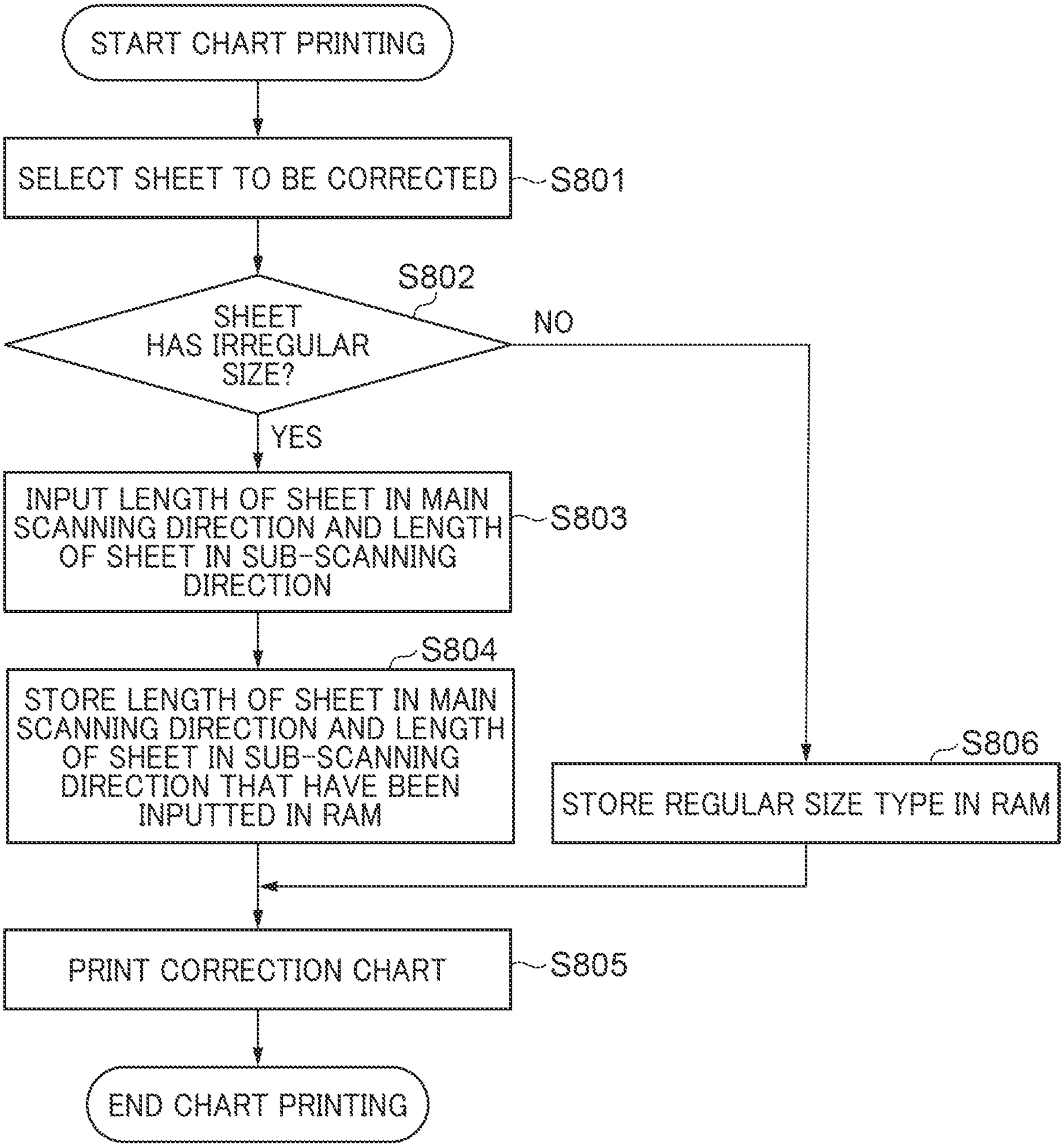
FIG. 8 is a flowchart showing a processing performed in a step S501 (a subroutine) of the flowchart shown in FIG. 5.

FIG. 8 is a flowchart showing a processing performed in the step S501 (a subroutine) of the flowchart shown in FIG. 5. As shown in FIG. 8, in a step S801, the CPU 111 controls the operation unit 150 to display the printing position adjustment screen 404 shown in FIG. 4B.

In a step S802, the CPU 111 determines whether or not the sheet feeding stage 406 has been selected on the printing position adjustment screen 404. As a result of the determination in the step S802, in the case of being determined that the sheet feeding stage 406 has been selected, the processing shown in FIG. 8 proceeds to a step S803. On the other hand, as the result of the determination in the step S802, in the case of being determined that the sheet feeding stage 406 has not been selected, that is, the sheet feeding stage 405 has been selected, the processing shown in FIG. 8 proceeds to a step S806.

In the step S803, the CPU 111 controls the operation unit 150 to display the sheet size setting screen 410 shown in FIG. 4D. As a result, it becomes possible to input the length of the sheet in the main scanning direction and the length of the sheet in the sub-scanning direction into the input box 412 on the sheet size setting screen 410.

In a step S804, in the case that the length of the sheet in the main scanning direction and the length of the sheet in the sub-scanning direction have been inputted in the step S803, the CPU 111 stores (saves) the respective input values in the RAM 112.

In a step S805, the CPU 111 controls the printer 140 to perform printing of the adjustment chart (a correction chart).

In the step S806, the CPU 111 stores, in the RAM 112, information about the regular size of the sheet installed in the sheet feeding stage 405. Here, only information about the regular size type such as A4 size or A3 size is stored, and information about the lengths of the sheet are not stored. After the execution of the step S806, the processing shown in FIG. 8 proceeds to the step S805.

Figure 9:
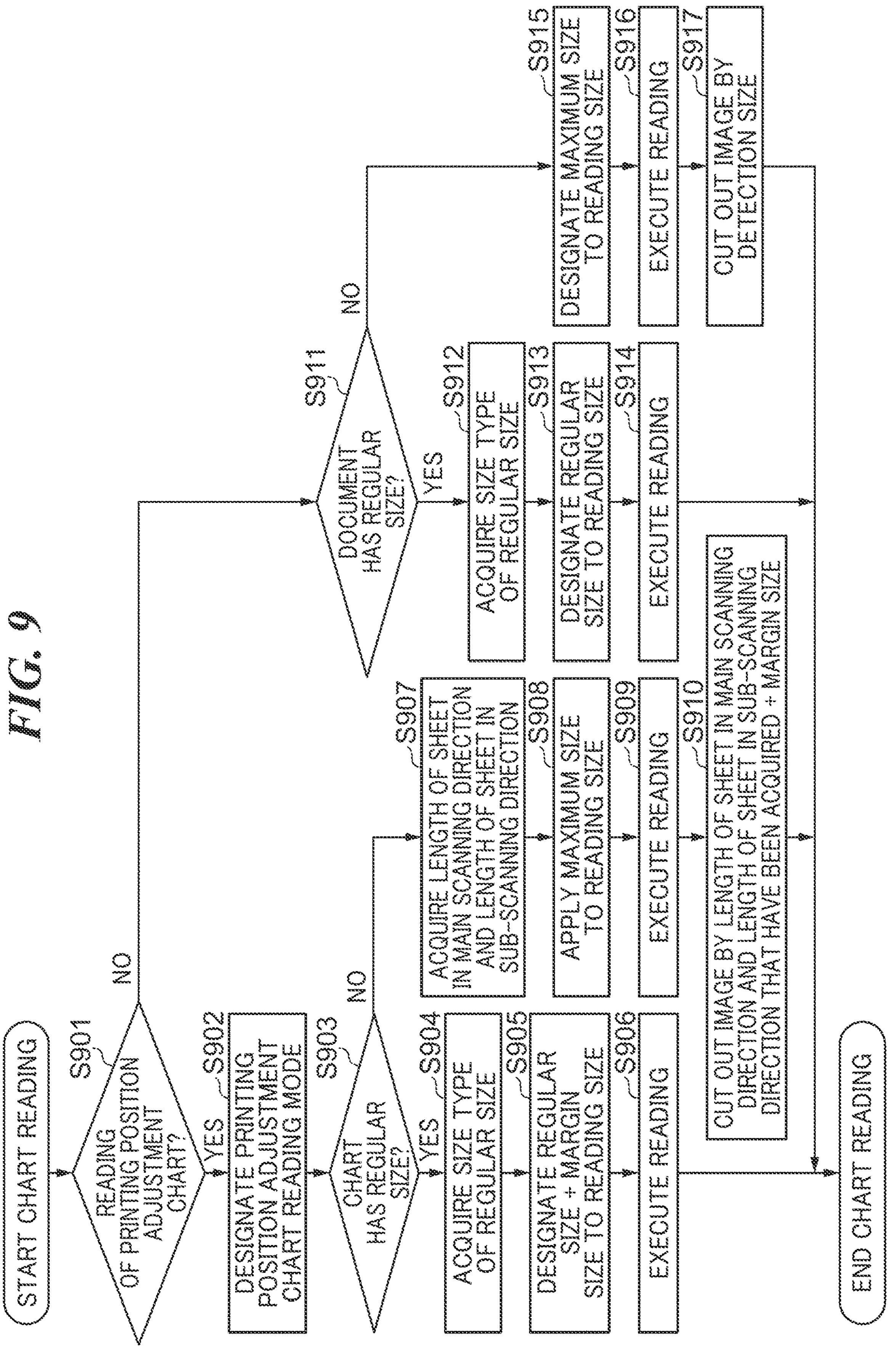
FIG. 9 is a flowchart showing a processing performed in a step S502 (a subroutine) of the flowchart shown in FIG. 5.

FIG. 9 is a flowchart showing a processing performed in the step S502 (a subroutine) of the flowchart shown in FIG. 5. As shown in FIG. 9, in a step S901, the CPU 111 determines whether or not the reading is reading of the adjustment chart, that is, determines whether the reading is reading of the adjustment chart or the reading is reading with a normal function such as copying. This determination is made based on, for example, whether or not the printing position adjustment mode 420 has been selected on the mode switching screen 418 shown in FIG. 4F. As a result of the determination in the step S901, in the case of being determined that the reading is reading of the adjustment chart, the processing shown in FIG. 9 proceeds to a step S902. On the other hand, as the result of the determination in the step S901, in the case of being determined that the reading is not reading of the adjustment chart, the processing shown in FIG. 9 proceeds to a step S911.

In the step S902, the CPU 111 designates the scanner 130 to execute the printing position adjustment described above.

In a step S903, the CPU 111 determines whether or not the adjustment chart is a chart printed on the sheet having a regular size. As a result of the determination in the step S903, in the case of being determined that the adjustment chart is a chart printed on the sheet having a regular size, the processing shown in FIG. 9 proceeds to a step S904. On the other hand, as the result of the determination in the step S903, in the case of being determined that the adjustment chart is not a chart printed on the sheet having a regular size, the processing shown in FIG. 9 proceeds to a step S907.

In the step S904, the CPU 111 acquires, from the RAM 112, information about that the adjustment chart is a chart printed on the sheet having which size among the regular size types.

In a step S905, the CPU 111 acquires (calculates) the length of the adjustment chart in the main scanning direction and the length of the adjustment chart in the sub-scanning direction based on the information acquired in the step S904. Then, the CPU 111 designates a region, which is obtained by adding the length C and the length D to the length of the adjustment chart in the main scanning direction and adding the length E and the length F to the length of the adjustment chart in the sub-scanning direction, as a reading range for the adjustment chart.

In a step S906, the CPU 111 controls the scanner 130 to perform reading of the adjustment chart in the reading range designated in the step S905. As a result, the read image of the adjustment chart is obtained.

In the step S907 after the execution of the step S903, the CPU 111 acquires, from the RAM 112, the length A of the sheet in the main scanning direction and the length B of the sheet in the sub-scanning direction, which have been stored in the RAM 112 in the step S804.

In a step S908, the CPU 111 applies (designates) the maximum range in which reading by the scanner 130 is possible (the maximum range readable by the scanner 130), as the reading range for the adjustment chart. It should be noted that, in the sub-scanning direction, the length P, which is the maximum length in which reading by the scanner 130 is possible, is applied.

In a step S909, the CPU 111 controls the scanner 130 to perform reading of the adjustment chart in the reading range designated in the step S908. As a result, the read image of the adjustment chart is obtained.

In a step S910, the CPU 111 cuts out an adjustment image to be used for the printing position adjustment from the read image obtained in the step S909. As described above, the length obtained by adding the length C and the length D to the length A is applied in the main scanning direction of the cutout range, and the length obtained by adding the length E and the length F to the length B is applied in the sub-scanning direction of the cutout range. As a result, the adjustment image is in a state of including the edges located in the main scanning direction of the adjustment chart and the edges located in the sub-scanning direction of the adjustment chart. In addition, the adjustment image is in a state of also including the markers 601 and the identification patch 602.

In the step S911 after the execution of the step S901, the CPU 111 determines whether or not a document read by the scanner 130 is a document having a regular size. As a result of the determination in the step S911, in the case of being determined that the document read by the scanner 130 is a document having a regular size, the processing shown in FIG. 9 proceeds to a step S912. On the other hand, as the result of the determination in the step S911, in the case of being determined that the document read by the scanner 130 is not a document having a regular size, the processing shown in FIG. 9 proceeds to a step S915.

In the step S912, the CPU 111 acquires, from the operation unit 150, information about that the document is a document printed on the sheet having which size among the regular size types.

In a step S913, the CPU 111 acquires (calculates) the length of the document in the main scanning direction and the length of the document in the sub-scanning direction based on the information acquired in the step S912. Then, as a reading range for the document, the CPU 111 designates the length of the document in the main scanning direction as the length of the reading range for the document in the main scanning direction, and designates the length of the document in the sub-scanning direction as the length of the reading range for the document in the sub-scanning direction.

In a step S914, the CPU 111 controls the scanner 130 to perform reading of the document in the reading range designated in the step S913. As a result, a read image of the document is obtained.

In the step S915 after the execution of the step S911, similarly to the step S908, the CPU 111 applies (designates) the maximum range in which reading by the scanner 130 is possible (the maximum range readable by the scanner 130), as the reading range for the document.

In a step S916, the CPU 111 controls the scanner 130 to perform reading of the document in the reading range designated in the step S915. As a result, a read image of the document is obtained.

In a step S917, the CPU 111 cuts out an adjustment image to be used for the printing position adjustment from the read image obtained in the step S916. It should be noted that the adjustment image is cut out in the length detected by the scanner 130 in the sub-scanning direction.

After the execution of the steps S906, S910, S914, and S917, the CPU 111 (a detection unit) detects the respective edges and the respective markers 601 in the read image or the adjustment image. The CPU 111 is able to calculate the correction value for the printing position adjustment based on the detection result.

As described above, when performing the printing position adjustment of the image with respect to the sheet, the MFP 100 is able to acquire the adjustment image including the edges of the sheet regardless of the size of the sheet. This adjustment image is an image that can be sufficiently used for the printing position adjustment of the image. As a result, it is possible to accurately perform the printing position adjustment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-034559, filed on Mar. 7, 2023, which is hereby incorporated by reference herein in its entirety.

What is claimed is:

1. An image forming apparatus capable of performing image formation on a sheet and performing position adjustment of an image with respect to the sheet prior to the image formation, the image forming apparatus comprising:

a printing unit configured to be capable of printing an adjustment chart used for the position adjustment;

a storage unit configured to store a length of the adjustment chart in a main scanning direction and a length of the adjustment chart in a sub-scanning direction;

a reading unit configured to read the adjustment chart printed by the printing unit and acquire a read image of the adjustment chart; and a cutting unit configured to cut out an adjustment image to be used for the position adjustment from the read image, and wherein the reading unit reads the adjustment chart in a maximum range readable by the reading unit to acquire the read image, and the cutting unit determines a cutout range of the adjustment image with respect to the read image based on the length of the adjustment chart in the main scanning direction and the length of the adjustment chart in the sub-scanning direction, which have been stored in the storage unit, and cuts out the adjustment image in the cutout range.

2. The image forming apparatus according to claim 1, wherein the printing unit prints markers to be used for the position adjustment on an irregular size sheet to obtain the adjustment chart, and the adjustment image includes the markers, edges located in the main scanning direction of the adjustment chart, and edges located in the sub-scanning direction of the adjustment chart.

3. The image forming apparatus according to claim 2, further comprising:

a detection unit configured to detect the markers, the edges located in the main scanning direction of the adjustment chart, and the edges located in the sub-scanning direction of the adjustment chart, and wherein the position adjustment is performed based on a detection result obtained by the detection unit.

4. The image forming apparatus according to claim 2, wherein the cutting unit determines a length, which is obtained by adding lengths of predetermined margins from the edges located in the main scanning direction to the length of the adjustment chart in the main scanning direction, as a length of the cutout range in the main scanning direction, and determines a length, which is obtained by adding lengths of predetermined margins from the edges located in the sub-scanning direction to the length of the adjustment chart in the sub-scanning direction, as a length of the cutout range in the sub-scanning direction.

5. The image forming apparatus according to claim 4, further comprising:

a setting section configured to set the lengths of the respective predetermined margins.

6. The image forming apparatus according to claim 1, further comprising:

an input section configured to input the length of the adjustment chart in the main scanning direction and the length of the adjustment chart in the sub-scanning direction prior to printing of the adjustment chart by the printing unit, and wherein the storage unit stores an input result obtained by the input section.

7. The image forming apparatus according to claim 1, wherein the reading unit is configured to be capable of reading the adjustment chart while conveying the adjustment chart, and a conveyance direction of the adjustment chart is set as the sub-scanning direction, and a direction perpendicular to the conveyance direction and a thickness direction of the adjustment chart is set as the main scanning direction.

8. The image forming apparatus according to claim 1, further comprising:

a switching section configured to switch between a mode for executing the image formation and a mode for executing the position adjustment.

9. A control method for an image forming apparatus capable of performing image formation on a sheet and performing position adjustment of an image with respect to the sheet prior to the image formation, the control method comprising:

a printing step of capable of printing an adjustment chart used for the position adjustment;

a storing step of storing a length of the adjustment chart in a main scanning direction and a length of the adjustment chart in a sub-scanning direction;

a reading step of reading the adjustment chart printed in the printing step and acquiring a read image of the adjustment chart; and a cutting step of cutting out an adjustment image to be used for the position adjustment from the read image, and wherein in the reading step, the adjustment chart is read in a maximum range readable in the reading step to acquire the read image, and in the cutting step, a cutout range of the adjustment image with respect to the read image is determined based on the length of the adjustment chart in the main scanning direction and the length of the adjustment chart in the sub-scanning direction, which have been stored in the storing step, and the adjustment image is cut out in the cutout range.

10. A non-transitory computer-readable storage medium storing a program for causing a computer to execute a control method for an image forming apparatus capable of performing image formation on a sheet and performing position adjustment of an image with respect to the sheet prior to the image formation, the control method comprising:

a printing step of capable of printing an adjustment chart used for the position adjustment;

a storing step of storing a length of the adjustment chart in a main scanning direction and a length of the adjustment chart in a sub-scanning direction;

a reading step of reading the adjustment chart printed in the printing step and acquiring a read image of the adjustment chart; and a cutting step of cutting out an adjustment image to be used for the position adjustment from the read image, and wherein in the reading step, the adjustment chart is read in a maximum range readable in the reading step to acquire the read image, and in the cutting step, a cutout range of the adjustment image with respect to the read image is determined based on the length of the adjustment chart in the main scanning direction and the length of the adjustment chart in the sub-scanning direction, which have been stored in the storing step, and the adjustment image is cut out in the cutout range.

* * * * *